US007905083B2

(12) United States Patent
Orlando et al.

(10) Patent No.: US 7,905,083 B2
(45) Date of Patent: Mar. 15, 2011

(54) TURBOFAN ENGINE ASSEMBLY AND METHOD OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 950 days.

(21) Appl. No.: 11/554,997

(22) Filed: Oct. 31, 2006

(65) Prior Publication Data

US 2008/0098715 A1    May 1, 2008

(51) Int. Cl.
*F02K 3/02*  (2006.01)
*F02K 3/072* (2006.01)

(52) U.S. Cl. .................. 60/204; 60/226.1; 60/268

(58) Field of Classification Search ............. 60/226.1, 60/268, 39.162, 204
See application file for complete search history.

(56) References Cited

U.S. PATENT DOCUMENTS

| | | | |
|---|---|---|---|
| 3,861,139 A * | 1/1975 | Jones | 60/268 |
| 4,490,622 A | 12/1984 | Osborn | |
| 4,751,816 A | 6/1988 | Perry | |
| 4,827,712 A | 5/1989 | Coplin | |
| 5,010,729 A * | 4/1991 | Adamson et al. | 60/268 |
| 5,274,999 A | 1/1994 | Rohra et al. | |
| 5,809,772 A | 9/1998 | Giffin, III et al. | |
| 5,867,980 A | 2/1999 | Bartos | |
| 6,339,927 B1 | 1/2002 | DiPietro, Jr. | |
| 6,381,948 B1 | 5/2002 | Klingels | |
| 6,684,626 B1 | 2/2004 | Orlando et al. | |
| 6,763,654 B2 | 7/2004 | Orlando et al. | |
| 6,964,155 B2 | 11/2005 | McCune et al. | |
| 7,140,174 B2 | 11/2006 | Johnson | |
| 7,334,392 B2 | 2/2008 | Moniz et al. | |
| 2007/0084188 A1 | 4/2007 | Orlando et al. | |

FOREIGN PATENT DOCUMENTS

| | | |
|---|---|---|
| DE | 3933776 A1 | 4/1991 |
| EP | 1387060 A2 | 2/2004 |
| EP | 1403500 A1 | 3/2004 |
| EP | 1653064 A2 | 5/2006 |
| EP | 1 777 370 A2 | 4/2007 |

OTHER PUBLICATIONS

Anthony L. Dipietro, Integrated Fan-Core Twin Spool Counter-Rotating Turbofan Gas Turbine Engine, Jul. 2, 2002.
GB Search Report, Application No. GB0721191.5 (Feb. 25, 2008).
GB Search Report, App. No. GB0721187.3 (Feb. 25, 2008).

* cited by examiner

*Primary Examiner* — Ted Kim
(74) *Attorney, Agent, or Firm* — William Scott Andes, Esq.; Armstrong Teasdale LLP

(57) ABSTRACT

A turbofan engine assembly includes a core gas turbine engine including a high-pressure compressor, a combustor, and a high-pressure turbine, a booster compressor coupled upstream from the core gas turbine engine, an intermediate-pressure turbine coupled to the booster compressor, the intermediate-pressure turbine disposed downstream from the core gas turbine engine, a counter-rotating fan assembly disposed upstream from the booster compressor, the counter-rotating fan assembly comprising a first fan configured to rotate in a first direction and a second fan configured to rotate in an opposite second direction, and an intermediate-pressure turbine disposed downstream from the core gas turbine engine, wherein the intermediate-pressure turbine drives the booster compressor and the second fan assembly. A method of assembling the above turbofan engine assembly is also described herein.

18 Claims, 4 Drawing Sheets

# TURBOFAN ENGINE ASSEMBLY AND METHOD OF ASSEMBLING SAME

BACKGROUND OF THE INVENTION

This invention relates generally to gas turbine engines, and more specifically to turbofan engine assembly that includes a booster compressor driven by an intermediate-pressure turbine.

To facilitate increasing engine efficiency, at least one known turbofan assembly includes a counter-rotating low-pressure turbine that is coupled to a counter-rotating fan assembly. More specifically, to assemble a turbofan engine assembly that includes a counter-rotating low-pressure turbine, an outer rotating spool, a rotating frame, a mid-turbine frame, and two concentric shafts, are installed within the turbofan engine assembly to facilitate supporting the counter-rotating low-pressure turbine. However, while the use of a counter-rotating low-pressure turbine increases the overall engine efficiency, the overall weight, design complexity, and/or manufacturing costs of such an engine are increased.

BRIEF DESCRIPTION OF THE INVENTION

In one aspect, a method of assembling a turbofan engine assembly is provided. The method includes providing a core gas turbine engine including a high-pressure compressor, a combustor, and a high-pressure turbine, coupling a booster compressor upstream from the core gas turbine engine, coupling a intermediate-pressure turbine downstream from the core gas turbine engine, coupling the booster compressor to the intermediate-pressure turbine using a first shaft, coupling a counter-rotating fan assembly upstream from the booster compressor, the counter-rotating fan assembly including a first fan configured to rotate in a first direction and a second fan configured to rotate in an opposite second direction, and coupling the second fan assembly to the intermediate-pressure turbine such that the intermediate-pressure turbine drives the second fan assembly.

In another aspect, a turbofan engine assembly is provided. The turbofan engine assembly includes a core gas turbine engine including a high-pressure compressor, a combustor, and a high-pressure turbine, a booster compressor coupled upstream from the core gas turbine engine, an intermediate-pressure turbine coupled to the booster compressor, the intermediate-pressure turbine disposed downstream from the core gas turbine engine, and an intermediate-pressure turbine disposed downstream from the core gas turbine engine, wherein the intermediate-pressure turbine drives the booster compressor and the second fan assembly.

DETAILED DESCRIPTION OF THE INVENTION

Figure 1:
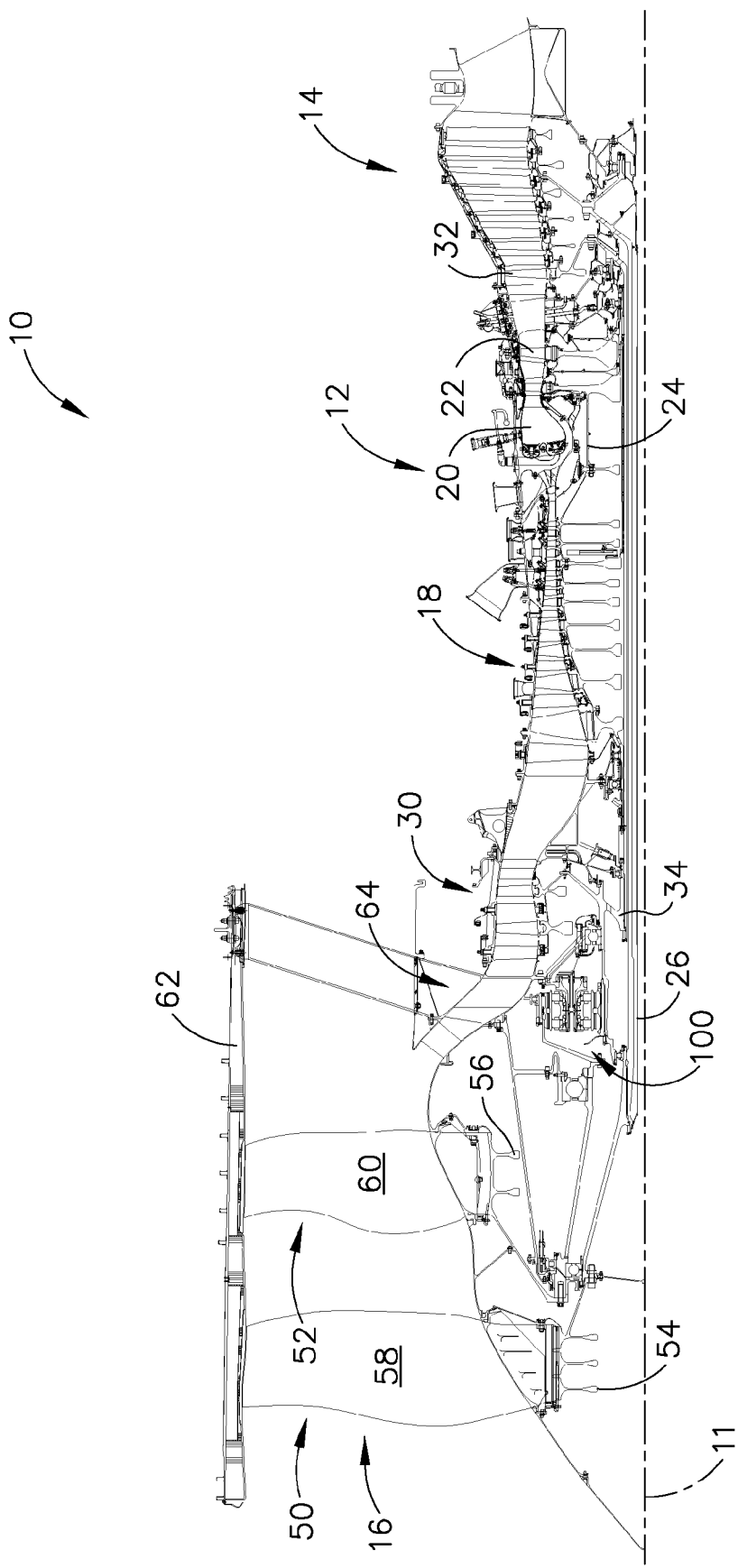
FIG. 1 is a cross-sectional view of a turbofan engine assembly.

FIG. 1 is a cross-sectional view of a portion of an exemplary turbofan engine assembly 10 having a longitudinal axis 11. In the exemplary embodiment, turbofan engine assembly 10 includes a core gas turbine engine 12, a low-pressure turbine 14 disposed axially downstream from core gas turbine engine 12 and a counter-rotating fan assembly 16 that is disposed axially upstream from core gas turbine engine 12. Core gas turbine engine 12 includes a high-pressure compressor 18, a combustor 20, and a high-pressure turbine 22 that is coupled to high-pressure compressor 18 via a shaft 24. In the exemplary embodiment, high-pressure turbine 22 includes two turbine stages. Optionally, high-pressure turbine 22 may include a single stage or have a stage count greater than two.

Figure 3:
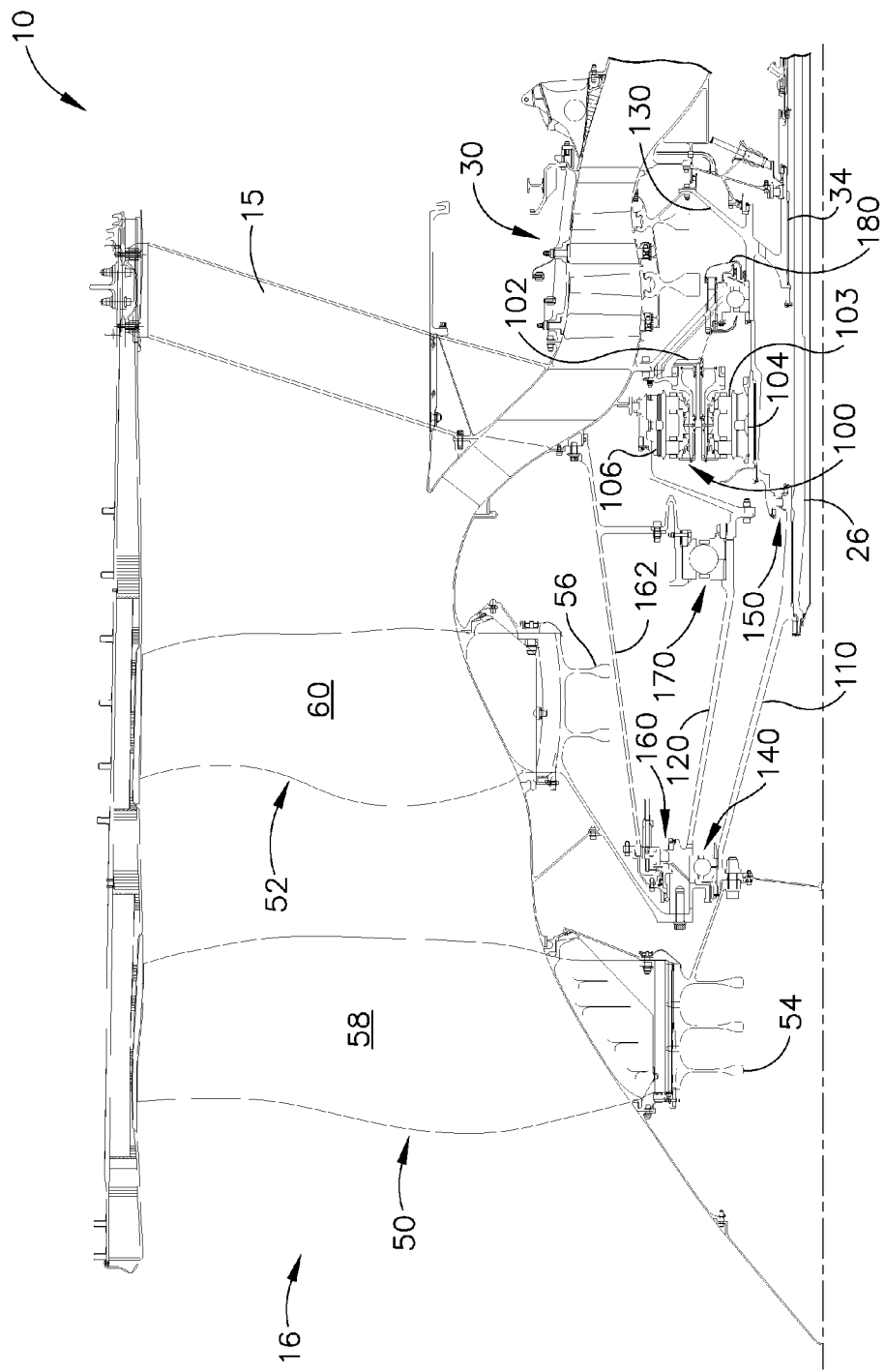
FIG. 3 is an enlarged cross-sectional view of the upstream portion of the turbofan engine assembly shown in FIG. 1.

In the exemplary embodiment, counter-rotating fan assembly 16 includes a first or forward fan assembly 50 and a second or an aft fan assembly 52 that is disposed downstream from forward fan assembly 50. The terms "forward fan" and "aft fan" are used herein to indicate that first fan assembly 50 is coupled axially upstream from second fan assembly 52. In the exemplary embodiment, fan assemblies 50 and 52 are each disposed upstream from core gas turbine engine 12, as shown in FIGS. 1 and 3. Fan assemblies 50 and 52 each include a respective rotor disk 54 and 56, and a plurality of rotor blades 58 and 60 that are coupled to each respective rotor disk. Counter-rotating fan assembly 16 is positioned within a fan nacelle 62.

In one embodiment, turbofan engine assembly 10 also includes a gooseneck 64 that extends between and facilitates coupling fan assembly 16 to a booster compressor 30. Moreover, gooseneck 64 includes a structural strut and/or aero strut to facilitate channeling air discharged from second fan assembly 52, through gooseneck 64, to a booster compressor 30. As such, the configuration of gooseneck 64 and the structural strut facilitate substantially reducing and/or eliminating ice and/or foreign particle ingestion into booster compressor 30 and thus core gas turbine engine 12 since gooseneck 64 substantially "hides" the booster compressor inlet and thus the core gas turbine engine inlet from the main air flowstream that is channeled axially past the exterior surface of gooseneck 64 in an aftward direction.

In the exemplary embodiment, turbofan engine assembly 10 is a three-spool engine wherein the first spool includes high-pressure compressor 18 that is coupled to high-pressure turbine 22 via shaft 24. The second spool includes low-pressure turbine 14 which is coupled to a portion of counter-rotating fan assembly 16 utilizing a shaft 26. Turbofan engine assembly 10 also includes a third spool that includes multi-stage booster compressor 30 that is coupled to an intermediate-pressure turbine 32 via a shaft 34 and to a portion of counter-rotating fan assembly 16 via a gearbox 100. As shown in FIG. 1, booster compressor 30 is disposed axially downstream from fan assembly 16 and axially upstream from core gas turbine engine 12. Moreover, intermediate-pressure turbine 32 is disposed axially downstream from high-pressure turbine 22 and axially upstream from low-pressure turbine 14.

Figure 2:
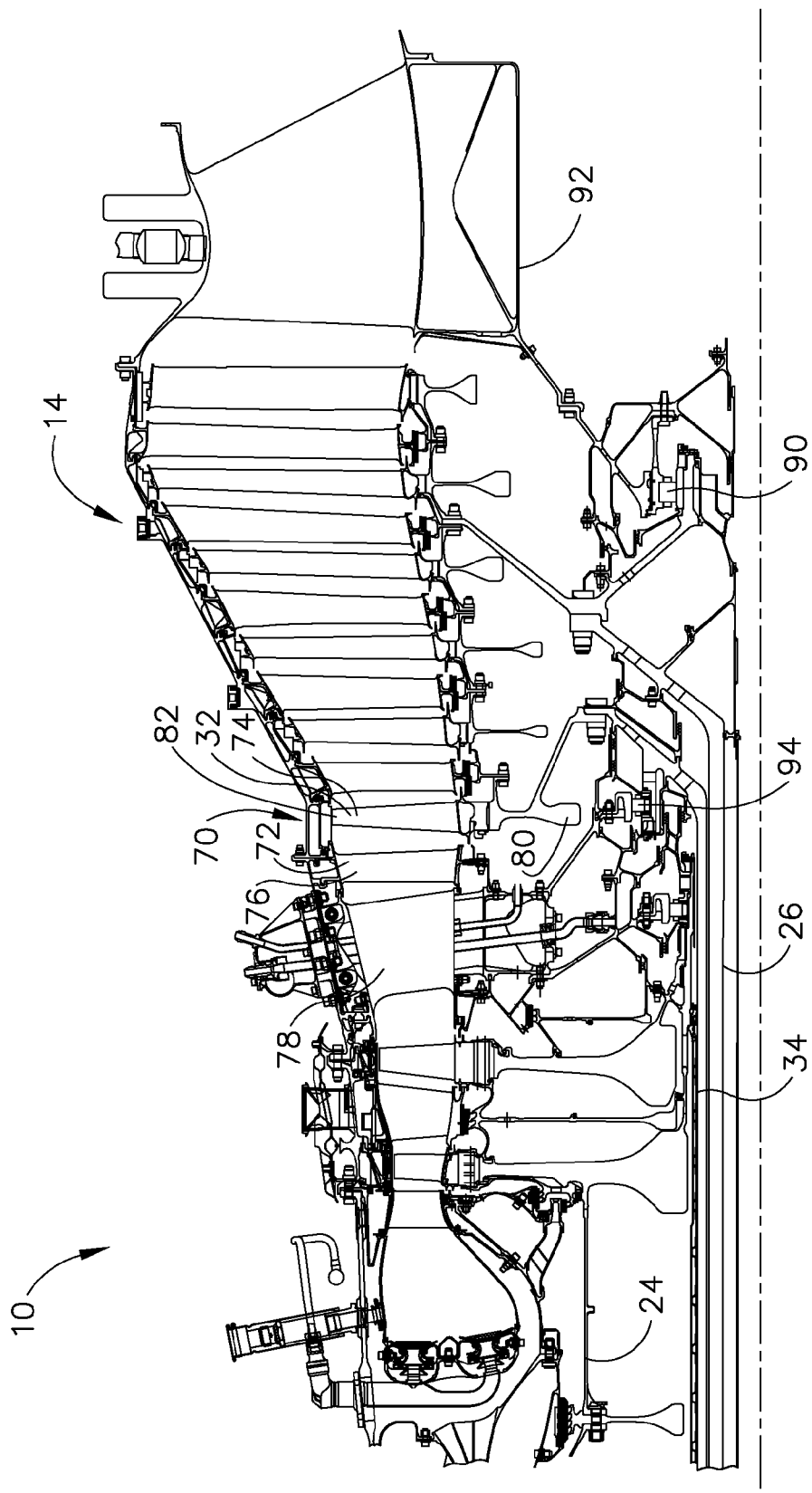
FIG. 2 is an enlarged cross-sectional view of the downstream portion of the turbofan engine assembly shown in FIG. 1.

FIG. 2 illustrates an enlarged cross-sectional view of the downstream portion of turbofan engine assembly 10 shown in FIG. 1. In the exemplary embodiment, intermediate-pressure turbine 32 includes a single stage 70 that includes a stator vane section 72 and a rotor section 74 that is downstream from stator vane section 72. Stator vane section 72 includes a plurality of stationary stator vanes 76 that are coupled to a turbine mid-frame 78. Rotor section 74 includes a disk 80 and a plurality of blades 82 that are coupled to disk 80. As shown in FIG. 2, disk 80 is coupled to shaft 34 and thus to booster compressor 30, shown in FIG. 1. As shown in FIG. 2, shaft 34 is disposed radially outwardly from shaft 26, and shaft 24 is disposed radially outwardly from shaft 34. Although the exemplary embodiment, describes intermediate-pressure turbine 32 as including a single stage 70, it should be realized that intermediate-pressure turbine 32 may include a plurality of stages.

Turbofan engine assembly 10 also includes a bearing assembly 90 that is utilized to provide radial support for low-pressure turbine 14. In the exemplary embodiment, bearing assembly 90 is a roller bearing that is disposed between low-pressure turbine 14 and a turbine rear-frame 92 to provide radial support to low-pressure turbine 14. Moreover, a roller bearing assembly 94 is disposed between intermediate-pressure turbine 32 and turbine mid-frame 78 to provide radial support for intermediate-pressure turbine 32.

FIG. 3 illustrates an enlarged cross-sectional view of the upstream portion of turbofan engine assembly 10 shown in FIG. 1. In use, low-pressure turbine 14 is utilized to drive first or forward fan assembly 50 in a first rotational direction via shaft 26, and gearbox 100 is utilized to drive second or downstream fan assembly 52 in a second rotational direction that is opposite to the first rotational direction. In the exemplary embodiment, gearbox 100 is a planetary gearbox that has a generally toroidal shape to allow gearbox 100 to be positioned circumferentially around drive shaft 26. As shown in FIG. 3, gearbox 100 includes a housing 102, at least one gear 103 that is coupled within housing 102, an input 104 that is coupled to shaft 34, and an output 106 that is used to drive second fan assembly 52.

More specifically, turbofan engine assembly 10 includes a shaft 110 that is coupled between first fan assembly 50 and splined to shaft 26, a shaft 120 that is coupled between second fan assembly 52 and gearbox output 106, and a torque cone 130 that is coupled between booster compressor 30 and shaft 34 such that booster compressor 30 is driven by intermediate-pressure turbine 32, shown in FIGS. 1 and 2. Moreover, intermediate-pressure turbine 32 is utilized to drive both booster compressor 30, via shaft 34, and to drive second fan assembly 52, via gearbox 100. As such, the second fan assembly 52 rotates at a rotational speed that is different, and preferably less than, the rotational speed of both the booster compressor 30, and the intermediate-pressure turbine 32. Additionally, since booster compressor 30 is coupled directly to intermediate-pressure turbine 32 via shaft 34 and torque cone 130, booster compressor 30 rotates at the same rotational speed and in the same rotational direction as intermediate-pressure turbine 32.

In one embodiment, gearbox 100 has a gear ratio of approximately 2.0 to 1 such that forward fan assembly 50 rotates at a rotational speed that is approximately twice the rotational speed of aft fan assembly 52. In another embodiment, gearbox 100 has a gear ratio that allows first fan assembly 50 to rotate with a rotational speed that is between approximately 0.67 and approximately 2.1 times faster than the rotational speed of second fan assembly 52. In this embodiment, since first fan assembly 50 is coupled directly to low-pressure turbine 14, via shaft 26 and shaft 110, first fan assembly 50 rotates at the same rotational speed and in the same rotational direction as low-pressure turbine 14.

In the exemplary embodiment, turbofan engine assembly 10 includes, a first bearing assembly, such as thrust bearing assembly 140, that is disposed at an upstream end between shaft 110 and shaft 120. Thrust bearing assembly 140 is utilized to substantially balance the thrust loads generated by first fan assembly 50, second fan assembly 52, and low-pressure turbine 14, shown in FIGS. 1 and 2, and transmit any residual thrust through thrust bearing 170 to a stationary support structure, such as fan frame 15.

Turbofan engine assembly 10 also includes a roller bearing assembly 150 that is disposed at a downstream end between shaft 110 and gearbox 100. Roller bearing assembly 150 acts as a differential bearing assembly in combination with thrust bearing assembly 140 to provide radial support for first fan assembly 50. A roller bearing assembly 160 is disposed between an upstream end of shaft 120 and a structural member 162 that is coupled to fan frame 15. Roller bearing 160 provides radial support for second fan assembly 52.

Turbofan engine assembly 10 also includes a thrust bearing assembly 170 that is disposed at a downstream end of shaft 120, between shaft 120 and structural member 162. Thrust bearing assembly 170 is utilized to absorb the thrust loads generated by second fan assembly 52 and transmit the residual thrust loads from first fan assembly 50, second fan assembly 52, and low-pressure turbine 14 to fan frame 15 via structural member 162.

Turbofan engine assembly 10 also includes a thrust bearing assembly 180 that is disposed between shaft 34 and fan frame 15. Thrust bearing assembly 180 is utilized to substantially balance the thrust loads generated by booster compressor 30 and intermediate-pressure turbine 32, shown in FIGS. 1 and 2, and transmit any residual thrust to a stationary support structure, such as fan frame 15

During operation, core gas turbine engine 12 produces an exhaust gas stream that is utilized to drive both intermediate-pressure turbine 32 and thus booster compressor 30, via shaft 34, and to also drive second fan assembly 52, via gearbox 100. Moreover, the core engine exhaust gas stream is also utilized to drive low-pressure turbine 14, and thus the first fan assembly 50 via shaft 26. During operation, gearbox 100 is continuously lubricated.

Figure 4:
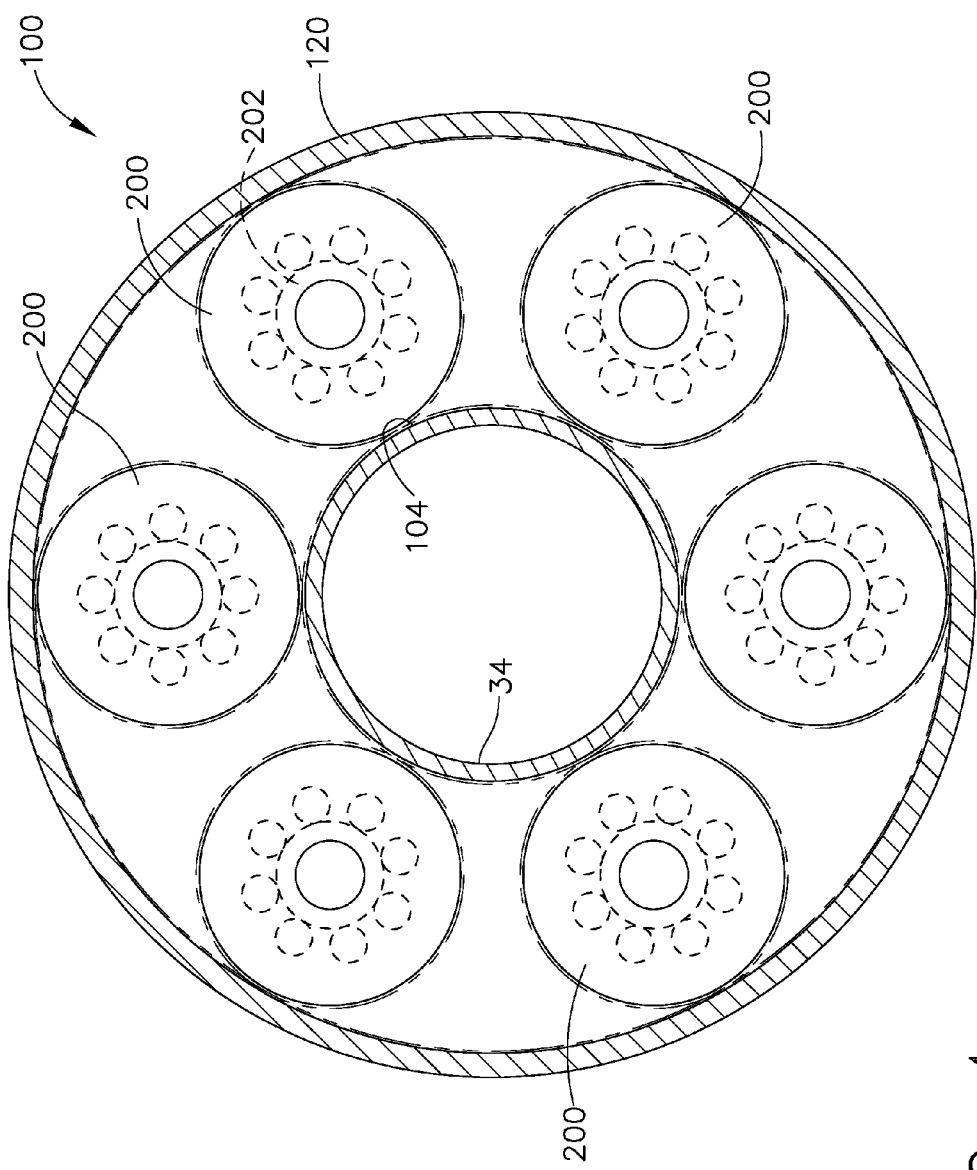
FIG. 4 is an end view of the gearbox shown in FIGS. 1, 2, and 3.

FIG. 4 is an end view of gearbox 100 illustrated in FIGS. 1, 2, and 3. As shown in FIG. 4, gearbox 100 including a plurality of planet gears 200 that are retained within a gear housing. Gearbox input 104 is coupled to shaft 34 such that the intermediate-pressure turbine 32 drives planet gears 200. Moreover, the gearbox output 106 is coupled to second fan assembly 52 via shaft 120. As such, intermediate-pressure turbine 32 drives booster compressor 30, and also drive second fan assembly 52, via gearbox 100 at a rotational speed that is approximately one-half the rotational speed of the forward fan assembly 50 and thus low-pressure turbine 14.

During assembly, a core gas turbine engine including a high-pressure compressor, a combustor, and a high-pressure turbine is provided. A booster compressor is coupled upstream from the core gas turbine engine, an intermediate-pressure turbine is coupled downstream from the core gas turbine engine, a counter-rotating fan assembly is coupled upstream from the booster compressor, the counter-rotating fan assembly including a first fan configured to rotate in a first direction and a second fan configured to rotate in an opposite second direction, and the intermediate-pressure turbine is coupled to the second fan assembly, via a gearbox, such that the intermediate-pressure turbine drives the second fan assembly.

The turbofan engine assembly described herein is a three-spool turbofan engine assembly that includes an intermediate-pressure turbine that is coupled directly to a booster compressor and is also coupled to a second fan assembly of a counter-rotating fan assembly via a gearbox. The assembly described herein reduces at least some of the complexities associated with known counter-rotating low-pressure turbines. More specifically, the turbofan engine assembly described herein includes a counter-rotating fan assembly that includes a first or forward fan assembly that is coupled directly to a single-rotating low-pressure turbine, and a second, or downstream fan assembly that is driven by the intermediate-pressure turbine via a gearbox. In the exemplary embodiment, the forward fan rotates at a rotational speed that is approximately twice the rotational speed of the downstream fan to achieve peak efficiency. This design allows a high speed low-pressure turbine with a reduced quantity of stages to be utilized and further improves the efficiency of the low-pressure turbine.

The booster compressor and the second fan assembly are each driven by a single stage intermediate-pressure turbine at a rotational speed that is between the rotational speed of the low-pressure turbine and the high-pressure compressor. More specifically, the intermediate-pressure turbine rotates at a rotational speed that is less than the rotational speed of the high-pressure compressor and greater than the rotational speed of the low-pressure turbine to increase the overall engine pressure ratio, improve performance, and reduce the number of stages in the booster.

The benefits of utilizing a counter-rotating fan are increased fan efficiency, reduced fan tip speed, lower noise or smaller fan diameter than comparable single fan engine and elimination of the bypass outlet guide vanes. The elimination of the counter-rotating low-pressure turbine also results in the elimination of the mid turbine frame, outer rotating spool, rotating rear frame, second low-pressure turbine shaft and the outer rotating seal located between the outer rotating spool and the outer stationary casing.

The turbofan engine assembly described herein improves the previous concepts in that a high-speed booster is directly driven by a single stage intermediate-pressure turbine. This concept will allow better pressure rise matching between the fan hub, booster and the high-pressure compressor. During operation, the turbofan engine assembly described herein is estimated to be substantially lighter than the current counter-rotating fan engines being studied. The result is about a 1.6% improvement in fuel burn when compared to a comparable single-rotation engine at constant noise. A performance benefit of about 1.6% in SFC could be obtained if the counter-rotating engine is designed to a similar fan diameter as a comparable single-rotation engine. This turbofan engine assembly has the potential to more readily meet the low noise requirements, improved fuel burn, and need for more electric designs being demanded by the airline industry. This configuration contains all the major changes from a conventional engine in the front of the geared engine for easy access.

While the invention has been described in terms of various specific embodiments, those skilled in the art will recognize that the invention can be practiced with modification within the spirit and scope of the claims.

What is claimed is:

1. A method of assembling a turbofan engine assembly comprises:
    providing a core gas turbine engine including a high-pressure compressor, a combustor, and a high-pressure turbine;
    coupling a booster compressor upstream from the core gas turbine engine;
    coupling an intermediate-pressure turbine downstream from the core gas turbine engine;
    coupling the booster compressor to the intermediate-pressure turbine using a first shaft;
    coupling a counter-rotating fan assembly upstream from the booster compressor, the counter-rotating fan assembly including a first fan assembly configured to rotate in a first direction and a second fan assembly configured to rotate in an opposite second direction, the first fan assembly including a plurality of blades that extend substantially to an inner surface of a nacelle surrounding the counter-rotating fan assembly, the second fan assembly including a plurality of blades that extend substantially to the inner surface;
    coupling the second fan assembly to the intermediate-pressure turbine such that the intermediate-pressure turbine drives the second fan assembly at a speed different than that of the booster compressor; and
    coupling a low-pressure turbine downstream from the intermediate-pressure turbine; and coupling the first fan assembly directly to the low-pressure turbine such that the first fan assembly rotates at the same rotational speed and in the same rotational direction as the low-pressure turbine.

2. A method in accordance with claim 1, further comprising coupling a gearbox between the intermediate-pressure turbine and the second fan assembly.

3. A method in accordance with claim 2, wherein the gearbox includes an input and an output, said method further comprising coupling the gearbox input to the intermediate-pressure turbine, and coupling the gearbox output to the second fan assembly such that the second fan assembly rotates in a rotational direction that is opposite to the rotational direction of the first fan assembly, and such that the second fan assembly rotates at a rotational speed that is approximately one-half the rotational speed of the first fan assembly.

4. A method in accordance with claim 1, further comprising coupling a planetary gearbox between the intermediate-pressure turbine and the second fan assembly.

5. A method in accordance with claim 1, further comprising coupling a gooseneck between the booster compressor and the core gas turbine engine to channel air discharged from the booster compressor to the core gas turbine engine.

6. A method in accordance with claim 1, further comprising providing a core gas turbine engine that includes a single stage high-pressure turbine.

7. A method in accordance with claim 1, further comprising coupling a single-stage intermediate-pressure turbine downstream from the core gas turbine engine.

8. A method in accordance with claim 1, further comprising:
    coupling a first thrust bearing between the first fan assembly and the low-pressure turbine to substantially balance the thrust loads generated by the first fan assembly and the low-pressure turbine; and
    coupling a second thrust bearing between the second fan assembly and a fan frame to transmit the residual thrust load generated by the first fan assembly, the second fan assembly, and the low-pressure turbine to the fan frame.

9. A method in accordance with claim 1, further comprising coupling a thrust bearing between the booster compressor and a fan frame to transmit thrust loads generated by the booster compressor and the intermediate-pressure turbine to the fan frame.

10. A turbofan engine assembly comprising:
    a core gas turbine engine comprising a high-pressure compressor, a combustor, and a high-pressure turbine;
    a booster compressor coupled upstream from said core gas turbine engine;
    a counter-rotating fan assembly disposed upstream from said booster compressor, said counter-rotating fan assembly comprising a first fan assembly configured to rotate in a first direction and a second fan assembly configured to rotate in an opposite second direction, said first fan assembly including a plurality of blades that extend substantially to an inner surface of a nacelle surrounding the counter-rotating fan assembly, said second fan assembly including a plurality of blades that extend substantially to the inner surface;

an intermediate-pressure turbine disposed downstream from said core gas turbine engine, said intermediate-pressure turbine used to drive said booster compressor and said second fan assembly at different rotational speeds; and a low-pressure turbine disposed downstream from said intermediate-pressure turbine, said low-pressure turbine coupled to said first fan assembly such that the first fan assembly rotates at the same rotational speed and in the same rotational direction as the low-pressure turbine.

11. A turbofan engine assembly in accordance with claim 10, further comprising a gearbox coupled between said intermediate-pressure turbine and second fan assembly.

12. A turbofan engine assembly in accordance with claim 11, wherein said gearbox comprises an input and an output, said input coupled to said intermediate-pressure turbine and said output coupled to said second fan assembly.

13. A turbofan engine assembly in accordance with claim 11 wherein said gearbox comprises an input and an output, said input coupled to said intermediate pressure turbine and said output coupled to said second fan assembly to drive said second fan assembly at a second rotational speed that is approximately one-half the rotational speed of said first fan assembly.

14. A turbofan engine assembly in accordance with claim 10 further comprising a planetary gearbox coupled between said intermediate-pressure turbine and said second fan assembly.

15. A turbofan engine assembly in accordance with claim 10, further comprising a gooseneck coupled between said booster compressor and said core gas turbine engine to channel air discharged from said booster compressor to said core gas turbine engine.

16. A turbofan engine assembly in accordance with claim 10, wherein said high-pressure turbine comprises a single-stage high-pressure turbine.

17. A turbofan engine assembly in accordance with claim 10, wherein said intermediate-pressure turbine comprises a single-stage intermediate-pressure turbine.

18. A turbofan engine assembly in accordance with claim 10, further comprising:

a first thrust bearing coupled between said first fan assembly and said low-pressure turbine to substantially balance the thrust loads generated by said first fan assembly and said low-pressure turbine; and a second thrust bearing coupled between said second fan assembly and a fan frame to transmit the residual thrust load generated by said first fan assembly, said second fan assembly, and said low-pressure turbine to said fan frame.

* * * * *